United States Patent [19]

Potter

[11] 4,127,343
[45] Nov. 28, 1978

[54] INNER TUBE FOR SCREW JACK
[75] Inventor: Robert H. Potter, Benton Harbor, Mich.
[73] Assignee: Auto Specialties Manufacturing Company, St. Joseph, Mich.
[21] Appl. No.: 834,272
[22] Filed: Sep. 19, 1977
[51] Int. Cl.² ............................................. F16B 3/00
[52] U.S. Cl. ................................. 403/285; 254/102; 285/392; 151/42; 403/118
[58] Field of Search ............ 29/511, 523, 525, 175 R; 285/392, 16, 329; 85/32 K; 151/41.74, 42, 33; 403/343, 285, 284, 43, 118; 254/102

[56] References Cited
U.S. PATENT DOCUMENTS

| | | | |
|---|---|---|---|
| 1,938,404 | 12/1933 | Shire | 254/102 |
| 2,808,837 | 10/1957 | Fassbender | 285/392 X |
| 2,851,292 | 9/1958 | McClain | 151/42 X |
| 2,955,847 | 10/1960 | McKenna | 285/392 X |

Primary Examiner—Andrew V. Kundrat
Attorney, Agent, or Firm—Olson, Trexler, Wolters, Bushnell & Fosse, Ltd.

[57] ABSTRACT

A screw tube assembly is disclosed for use in a screw jack or the like. The screw tube assembly comprises a hollow tube member in one end of which is formed a recess so as to reduce the tube member wall thickness. Into this recess an annular bushing is inserted. A tip portion of the recessed tube wall is crimped over the received bushing outer end to lock the bushing in the tube against axial movement. A chordal portion of the bushing and overlying tube is then displaced radially outwardly to form an external tube assembly key and to lock the bushing in the tube member against rotational motion.

9 Claims, 8 Drawing Figures

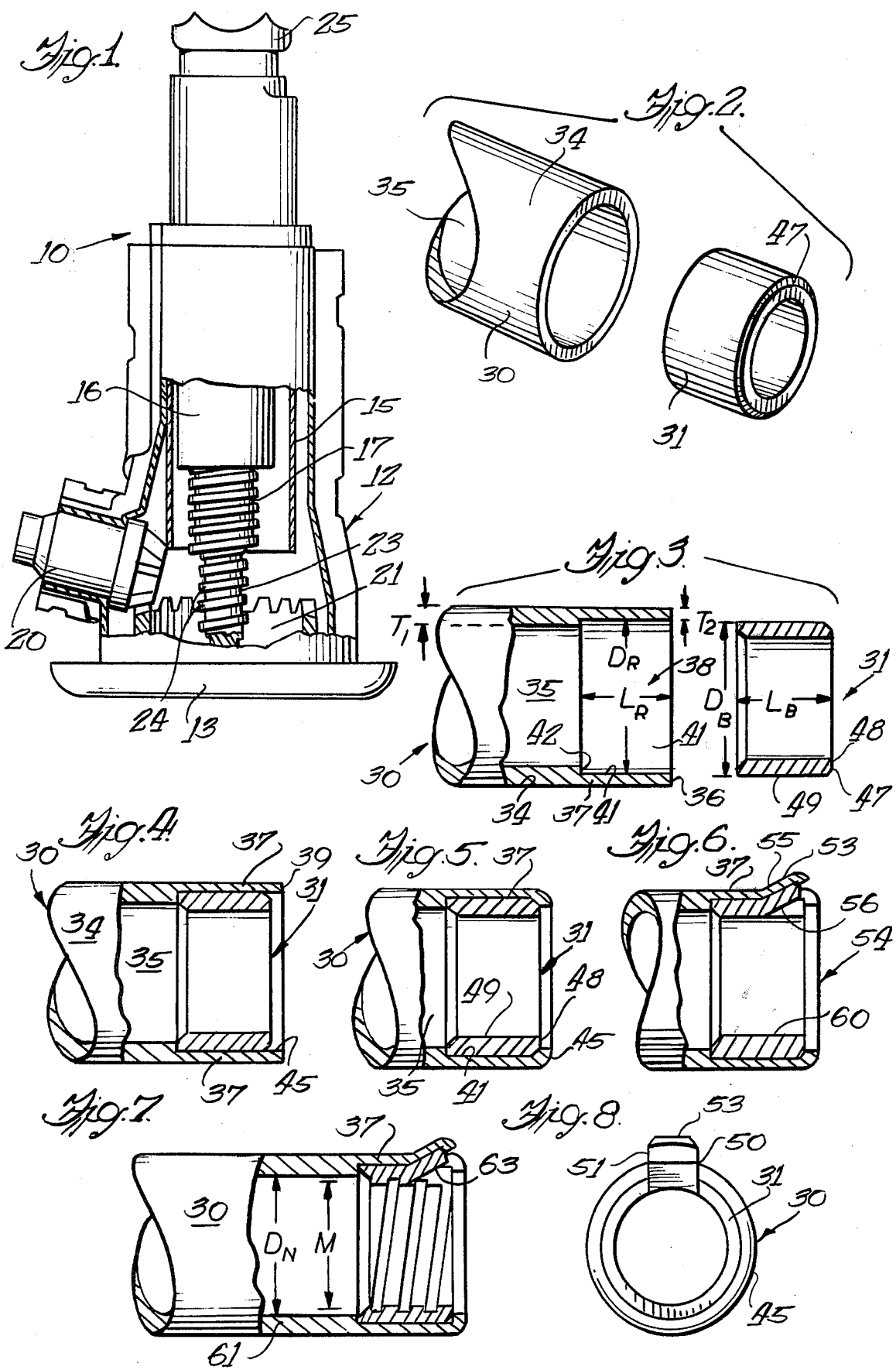

INNER TUBE FOR SCREW JACK

BACKGROUND OF THE INVENTION

This invention relates generally to lifting jacks of the screw type, and more particularly relates to an improved tube sleeve member for such lifting jacks.

Screw jacks are well known to motorists and others as powerful and useful devices for lifting trucks and other vehicles. For a screw jack to be competitive in today's marketplace, the jack must be low in offered price, high in strength, and safe in operation. The component parts of the jack must offer efficient and effective operation, long service life, and must be adapted for high-quantity production at low per-item cost. A successful screw jack, its parts, and methods for parts production are discussed in the 1937 U.S. Pat. No. 2,096,050 to Lucker.

An important part of such a jack is a lifting sleeve, which can be considered to be a hollow tube provided, at least at one end, with an internal thread. An external key portion prevents tube rotation in the adjacent sleeve. As explained in the '050 patent, a one-piece lifting sleeve of this type can be formed by upsetting one end of a tube stock segment. In practice, hot upsetting equipment was used. Recently imposed government requirements have now begun to render the hot upsetting method of producing screw jack sleeve tubes and the end product sleeves themselves somewhat less commercially attractive.

Providing these sleeve tubes in production-run-sized quantities and at commercially attractive per-item costs is not an easy task. For example, counter-drilling a tube from one end so as to leave a short length of full thickness wall for subsequent tapping from one end requires a relatively long drilling time. Projection welding a key clip on the tube adds to production time and expense, and controlling the quality of the welded key-tube joint has proved difficult — and, of course, adds further to production time and costs. Forming the necessary key by cold upset methods requires gathering a relatively large amount of metal from adjacent portions of the tube blank. When the metal is gathered and formed into the key, so little metal may remain in nearby portions of the tube blank that the internal tube thread cannot be properly formed.

Welding threadable bushings to tube blanks has proved expensive. Arc welding a bushing to a tube blank requires relatively complicated machining of the bushing and tube blank to adapt them for mechanized inert gas arc weldings. Quality assurance procedures must be imposed during the welding operation, and these procedures add to the finished item expense. Finally, the completed weld bead must be machined flush with the tube outer diameter and surface — yet another item of expense.

Friction welding a threadable bushing to a tube sleeve also requires careful quality control procedures. After welding, the tube internal surface must be bored, and the outer surface must be turned to remove welding flash. Again, these steps add to production costs.

Other methods of production are experimental in nature, and for various reasons do not lend themselves readily to the production of large numbers of tube sleeve end products at relatively low cost.

It is therefore an object of the present invention to provide an unobjectionable method for producing high quality screw jack sleeve tubes at minimal per-item cost.

Another object is to provide a method of manufacturing screw jack sleeves without using expensive hot upsetting equipment. A related object is to provide an end product tube which is not subject to the possibility of various undesireable characteristics introduced by hot forming processes.

Yet another object is to provide a screw sleeve tube and method of manufacturing that sleeve tube which permits the use of end-product material, for example, bushing material, tailored to functional sleeve requirements. A related object is to provide such a sleeve tube in a format which is of minimal cost, yet which utilizes materials of maximal effectiveness.

Yet another object is to provide a sleeve tube for a screw jack or like device in which the shoulder under the threaded section will be sharp and consistent so as to permit the exit end of the tapped thread to be consistently formed for ease of sub-assembly on automated equipment.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is an elevational view in partial section showing a screw jack of the type utilizing the novel screw tube;

FIG. 2 is an exploded view showing a portion of the raw stock tube member blank and an accompanying bushing blank;

FIG. 3 is a fragmentary partially sectioned view showing the tube member blank and bushing blank illustrated in FIG. 2 as they appear prior to bushing assembly within the tube member;

FIG. 4 is a fragmentary partially sectioned view similar to FIG. 3 showing the bushing inserted into a recess formed within the tube member blank;

FIG. 5 is a fragmentary partially sectioned view similar to FIGS. 3 and 4 showing the bushing assembled in the tube member and the tube end crimped to retain the bushing against axial motion relative to the tube member;

FIG. 6 is a fragmentary partially sectioned view similar to FIGS. 3-5 illustrating the tube member blank and bushing as they appear after formation of an external or male key;

FIG. 7 is a fragmentary partially sectioned view similar to FIGS. 3-6 illustrating the tube and bushing as they appear after a screw jack thread has been formed within and upon the internal surfaces of the bushing; and FIG. 8 is an end elevational view of the tube and bushing as they appear in FIG. 7.

DETAILED DESCRIPTION

While the invention will be described in connection with a preferred embodiment and procedure, it will be understood that it is not intended to limit the invention to this embodiment and procedure. On the contrary, it is intended to cover all alternatives, modifications and equivalents as may be included within the spirit and scope of the invention as defined by the appended claims.

Turning more specifically to FIG. 1, there is shown a jack 10 adapted to utilize the present invention. In general, this jack includes an upstanding housing member 12 fixed to a base plate member 13 which is horizontally extended to provide a firm supportive foundation upon underlying pavement or ground. The housing member 12 carries one or more screw members 15, 16, 17 adapted for extension or retraction relative to the housing member 12.

The jack 10 is operated by a handle (not shown) which is adapted to engage and rotate a pinion gear 20. The turning gear 20 rotates a crown gear 21 mounted, as by a bearing (not shown), upon the base plate 13, and the crown gear 21 in turn drives a screw member 23. This screw member 23 is provided with external or male threads 24 as shown, and these threads engage an internal or female thread formed over at least a portion of the threaded screw tube 17. This screw member 17 is provided with external, or male, threads as shown, and these threads engage an internal, or female, thread formed over at least a portion of the screw tube 16. At the top of the screw tube 16, a lift pad 25 is adapted to engage a specific part or parts of an automobile to provide safe, trouble-free vehicle lifting.

In accordance with the broad aspects of this invention, a screw tube assembly 16 can be inexpensively manufactured for use in the jack 10. This tube assembly 16 can be made from a stock, hollow, generally cylindrical tubular member 30 and an annular bushing 31. As illustrated more particularly in FIGS. 2 and 3, this hollow tube member 30 is at least partly defined by an outer surface 34 and a first inner surface 35. The metal comprising the tube wall 37 extending between these surfaces thus has a nominal or unrecessed thickness $T_1$.

Beginning at one outer end 36, the tube 30 has a recess 38 extending inwardly over an axial distance $L_R$. As shown particularly in FIG. 3, the recess 38 illustrated here is of cylindrical shape, and it is defined by a second tube inner surface 41 and a terminal step 42 extending radially outwardly from the first inner surface 35. Finished tube assembly strength is increased, and production and quality control problems decreased when the distance between the second inner surface 41 and the outer surface 34 — i.e., the recessed tube wall thickness $T_2$ — is made to approximate one-half the unrecessed tube wall thickness $T_1$.

This recess 38 is preferably formed by drilling or boring operations.

The bushing 31 is next inserted into the recess 38. It is a feature of the invention that difficult or expensive assembly operations are avoided here, and to this end, the bushing 31 is sized to fit into the recess 38 with a snug but slip fit; that is, the bushing 31 has an axial length $L_B$ shorter than the annular recess axial length $L_R$ by a distance substantially equal to the reduced thickness $T_2$ of the tube wall at the recess 38. Additionally, the bushing 31 has an outer diameter $D_B$ less than the diameter $D_R$ of the recess 38. When the bushing 31 is assembled into the recess 38 as described here, the bushing 31 and tube member 30 assume the positions illustrated in FIG. 4.

Next, a tip 45 of the tube member outer end 39 is crimped or bent radially inwardly from the position illustrated in FIG. 4 to the position illustrated in FIG. 5 over the bushing end 48. This operation locks the bushing 31 against axial movement relative to the tube member 30.

In carrying out the invention, damage to the recessed and relatively thin tube wall near the tip 45 can be avoided by forming a chamfer surface 47 at the outer axial end 48 of the bushing 31. Production costs can be minimized and the likelihood of tube wall damage can be discouraged by forming this chamfer surface 47 at a substantially 45° angle from the bushing outer surface 49 and the bushing axis. It has been found beneficial to axially extend this chamfer surface 47 over a distance substantially equal to the reduced tube wall thickness $T_2$. When the bushing 31 and tube recess 38 are formed as described here, it has been found that a smooth tube end crimp can be formed as shown in FIG. 5, and that the bushing 31 is securely locked in place against axial movement relative to the tube 30. Moreover, the tube recess tip 45 can be prevented from extending radially inwardly so far as to interfere with subsequent manufacturing operations or final tube assembly 16 into the jack 10, and the tube assembly production can be accomplished at a minimal expense.

It is another feature of the invention that a tube assembly male key 53 can be quickly, inexpensively, and relatively easily formed in the tube assembly. To this end, two substantially parallel cuts 50, 51 of axial orientation are made extending from the tube assembly outer end 39 through both the tube wall 37 and the underlying bushing 31 itself, as particularly illustrated in FIGS. 6 and 8. These cut lines 50, 51 extend axially for a distance less than the axial length $L_B$ of the bushing 31 and, preferably, extend over less than half the axial bushing length. The cut lines 50 and 51 can be formed as the key 53 itself is being formed by the machine tool. Conveniently, the machine tool can be set up to deform the chordal portion 55 of the tube 30 and the underlying corresponding chordal portion of the bushing 56 are in a radially outward direction, as illustrated in FIGS. 6–8. Here, this key information 53 takes the form of a diagonally arrayed ramp. This external key formation 53 is accepted in a keyway slot formed in adjacent parts of the finished jack 10 (FIG. 1), and additionally serves to lock the bushing 31 in the tube member 30 against relative tube member-bushing rotational motion.

To finish the tube assembly, a female internal thread is formed on the bushing inner surface 60. Precise, slip resistant jacking action can be obtained and damage to threaded parts discouraged by forming this thread in the Acme format. To permit smoother sleeve extension and retraction without interference, the maximum major diameter M of the internal thread is sized to be less than the internal diameter $D_N$ of the unrecessed portion 61 of the tube member 30.

It will be noted that manufacturing energy and time are conserved to some extent by first forming the keyway, so that the lower or internal bushing surface 63 of the keyway is not threaded. This is accomplished by forming the female thread in the bushing after the key has been formed. After the thread has been formed and the tube inspected, the finished tube assembly is passed to inventory, or to other jack assembly operations.

The invention is claimed as follows:

1. A tube assembly for use in a screw jack or the like, comprising in combination, a hollow tube member having an outer surface, a first inner surface, and a tube wall extending in thickness between the outer and first inner surfaces, the tube being provided at one end with a recess extending over a given axial distance within the tube from an outer tube end and being at least partly defined by a second tube inner surface located closer to the outer surface than the first inner surface, the tube wall thickness being correspondingly reduced at the recess location, and an annular bushing located within the tube member recess, the bushing being axially shorter than the annular recess by a distance substantially equal to the reduced thickness of the tube wall at the recess location, a tip portion of the tube recessed wall being crimped over the received bushing outer end to lock the bushing in the tube against relative tube member-bushing axial movement, a chordal portion of the bushing and a corresponding chordal portion of the tube member being displaced radially outwardly of the surrounding portions of the bushing and tube member to form an external tube assembly key and to lock the bushing in the tube member against relative tube member-bushing rotational motion.

2. A tube assembly according to claim 1 wherein said bushing includes a chamfer surface extending at substantially a 45° angle from a bushing outer surface, and having a chamfer axial length substantially equal to the reduced tube wall thickness of the tube member recess.

3. A tube assembly according to claim 1 wherein the tube member and bushing key forming portions are displaced radially outwardly between two axially oriented cut lines.

4. A tube assembly according to claim 3 wherein said tube member and bushing displaced key portions extend inwardly from the outer ends of the tube member and bushing over an axial distance less than one-half the bushing length.

5. A tube assembly according to claim 1 wherein said tube member has a wall which is substantially twice as thick as the reduced wall thickness at the tube member recess.

6. A tube assembly according to claim 5 wherein said bushing is provided with an outer diameter smaller than the inner diameter of the tube recess to permit a preliminary bushing slip fit into the tube recess.

7. A tube assembly according to claim 1 wherein said bushing is provided with an internal Acme thread formation on the bushing inner surface.

8. A tube assembly according to claim 7 wherein the maximum major diameter of the internal thread in the bushing is less than the internal diameter of the unrecessed portion of the tube member.

9. A tube assembly according to claim 1 wherein said tube member second inner surface is a right cylindrical surface, and wherein an annular step formation extends radially between said first and said second inner tube member surfaces.

* * * * *